United States Patent
Wöhrle et al.

(10) Patent No.: US 7,157,184 B2
(45) Date of Patent: Jan. 2, 2007

(54) METHOD FOR PRODUCING ELECTRODE SHEETS FOR ELECTROCHEMICAL ELEMENTS

(75) Inventors: Thomas Wöhrle, Ellwangen (DE); Peter Birke, Ellwangen (DE); Heinrich Stelzig, Rosenberg (DE); Konrad Holl, Aalen-Dewangen (DE); Dejan Ilic, Ellwangen (DE)

(73) Assignee: Microbatterie GmbH (DE)

( * ) Notice: Subject to any disclaimer, the term of this patent is extended or adjusted under 35 U.S.C. 154(b) by 0 days.

(21) Appl. No.: 10/154,141

(22) Filed: May 22, 2002

(65) Prior Publication Data

US 2002/0177041 A1 Nov. 28, 2002

(30) Foreign Application Priority Data

May 25, 2001 (DE) .................. 101 25 616

(51) Int. Cl.
*H01M 4/62* (2006.01)
(52) U.S. Cl. ....................... 429/217; 429/316
(58) Field of Classification Search .......... 429/144, 429/145, 217, 316; 29/623.3, 623.5
See application file for complete search history.

(56) References Cited

U.S. PATENT DOCUMENTS

| | | | |
|---|---|---|---|
| 5,296,318 A | 3/1994 | Gozdz et al. | 429/316 |
| 5,460,904 A | 10/1995 | Gozdz et al. | 429/316 |
| 5,609,975 A * | 3/1997 | Hasegawa et al. | 429/217 |
| 5,756,230 A | 5/1998 | Gao et al. | 429/309 |
| 6,077,624 A * | 6/2000 | Mitchell et al. | 429/217 |
| 6,143,444 A * | 11/2000 | Roh | 429/217 |
| 6,395,428 B1 | 5/2002 | Kezuka | 429/300 |
| 6,403,266 B1 * | 6/2002 | Kim et al. | 429/316 X |
| 6,534,219 B1 * | 3/2003 | Iijima et al. | 429/316 X |
| 6,692,873 B1 * | 2/2004 | Park et al. | 429/247 |
| 2002/0110732 A1 * | 8/2002 | Coustier et al. | 429/144 |

FOREIGN PATENT DOCUMENTS

| | | |
|---|---|---|
| CN | 1168742 A | 12/1997 |
| EP | 0 789 412 B1 | 8/1997 |
| EP | 1 005 099 | 5/2000 |
| EP | 1043732 A1 * | 10/2000 |
| JP | 2000-082470 | 3/2000 |

\* cited by examiner

Primary Examiner—Stephen J. Kalafut
(74) Attorney, Agent, or Firm—DLA Piper US LLP

(57) ABSTRACT

A method for producing electrode sheets for electrochemical elements which contain at least one lithium-intercalating electrode which is composed of a mixture of at least two copolymerized fluorized polymers in whose polymer matrix electrochemically active materials which are insoluble in the polymer are finely dispersed, the fluorized polymers are, having being dissolved as a solvent, mixed with electrochemically active materials, the resulting pasty substance is extruded to form a sheet and then laminated with a polyolefin separator, which is provided with a mixture of the two polymers, PVDF-HFP copolymers in each case being used as the polymer, and the proportion of HFP being less than about 8 percent by weight.

11 Claims, 1 Drawing Sheet

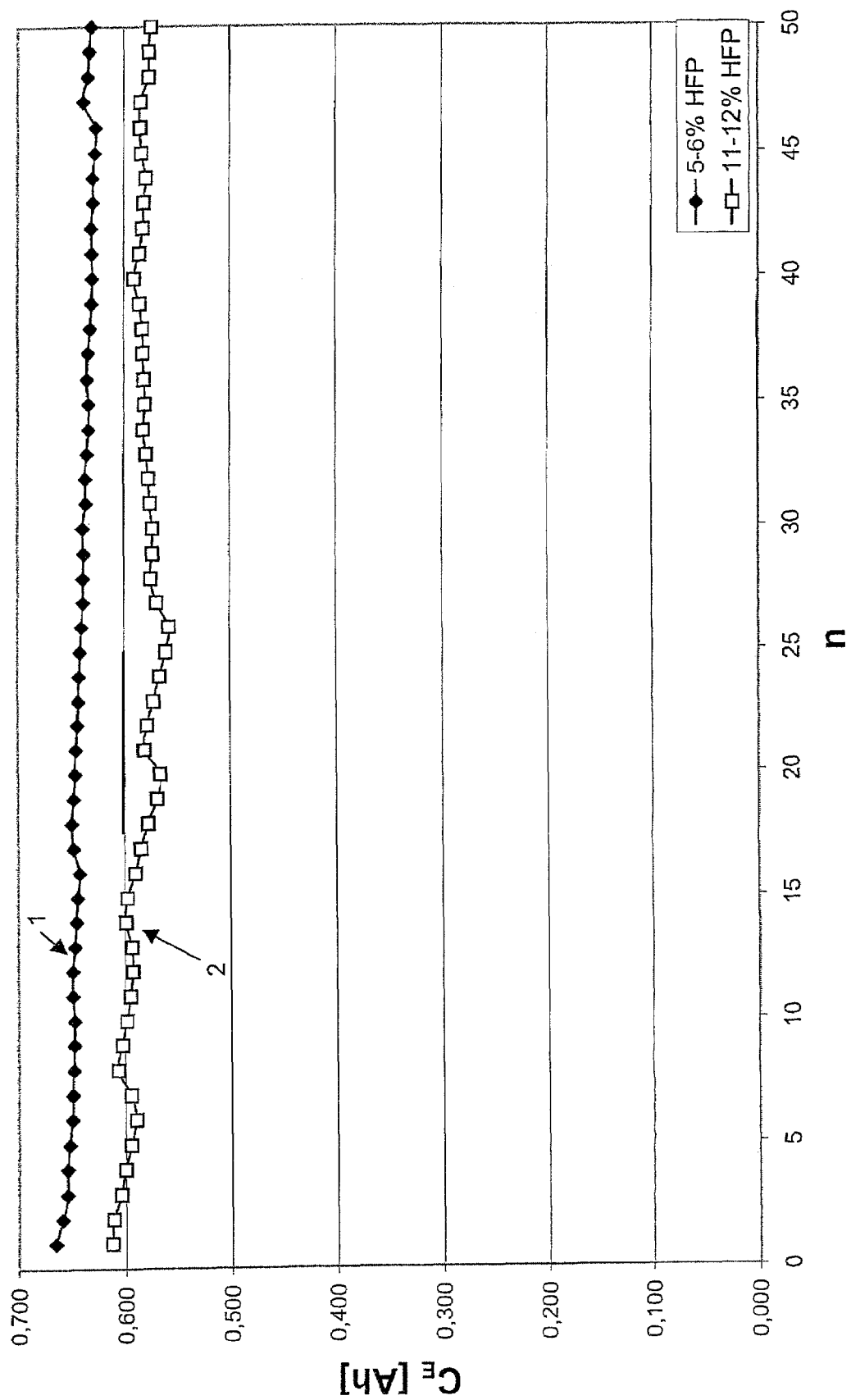

METHOD FOR PRODUCING ELECTRODE SHEETS FOR ELECTROCHEMICAL ELEMENTS

FIELD OF THE INVENTION

The invention relates to a method for producing electrode sheets for electrochemical elements which contain at least one lithium-intercalating electrode which is composed of a mixture of at least two copolymerized fluorized polymers in whose polymer matrix electrochemically active materials, which are insoluble in the polymer, are finely dispersed. The invention also relates to electrochemical elements having electrodes produced according to the method.

BACKGROUND

Adhesion between the electrode material and the separator and between electrodes and the respective output conductor sheet is of particular importance to the functionality of electrochemical elements. However, electrochemically, loss of content can also occur due to a simple breakdown in content as a result of the electrodes swelling in the electrolyte, or by gassing as a consequence of decomposition. Laminated cells are advantageous in this case, since no spontaneous loss of contact due to gassing occurs in such cells, and the form factor allows a high energy density to be achieved. As a result of the process used to produce it, a laminate is also more resistant to swelling.

The use of polymer electrolytes composed of a film of a copolymer of polyvinylidenefluoride-hexafluoropropylene (PVDF-HFP) and a lithium salt distributed as a conductive salt in it is disclosed in U.S. Pat. No. 5,296,318. The proportion of HFP in the copolymer should accordingly be between 8 and 25 percent by weight.

U.S. Pat. No. 5,460,904 discloses lithium-intercalating electrodes, in which the active substance is distributed in a matrix composed of polyvinylidenefluoride-hexafluoropropylene copolymer. A gel separator, produced from the same materials, is arranged between these electrodes, containing a softener, in particular dibutylphthalate, which is then dissolved out. The proportion of HFP and the gel electrolyte and in the electrode sheets is in each case between 8 and 25 percent by weight.

This method for producing cells has the disadvantage that the softener must be dissolved out. Furthermore, it results in a very soft separator, which can easily be laminated through during the production process, leading to short circuits in the cell. Thicker separator layers are thus required. This reduces the energy density. Furthermore, the proportion of $SiO_2$ in the separator is not stable in the long term, in conjunction with lithium electrodes.

It would, therefore, be advantageous to provide a method for producing electrode sheets of the type mentioned initially, which can be carried out easily, in which good contact is provided between the separator material and the electrode material, and which can be assembled to form cells which have high energy densities.

SUMMARY OF THE INVENTION

The invention relates to a method for producing electrodes for electrochemical elements which contain at least one lithium-intercalating electrode including mixing a copolymerized fluorinated polymer and electrochemically active material which is insoluble in the polymer to form a finely dispersed mixture, adding a solvent to the mixture to form a paste, applying the paste to a sheet to form a pasted sheet, applying a PVDF-HFP copolymer to a polyolefin separator, wherein the proportion of HFP to PVDF is less than about 8 percent by weight, and laminating the pasted sheet to the polyolefin separator.

The invention also relates to an electrochemical element having at least one electrode produced according to the method.

BRIEF DESCRIPTION OF THE DRAWING

The drawing is a graph showing the capacitance (c) of a 6-bicell stack as a function of the number of cycles (n).

DETAILED DESCRIPTION

We found that the small proportion of HFP in a PVDF-HFP composition provides, in particular, good bonding of the positive electrode material to an aluminum output conductor sheet. We also found that the oxidic particles of the active material, which are only semiconductive, make better contact with such small amounts of HFP in the polymer. Furthermore, reducing the proportion of HFP improves the process characteristic. The mixing of active materials and uniform extrusion to form a sheet, as well as the capability to laminate this, are improved. The use of a polyolefin-based separator, which is coated with PVDF-HFP copolymer, allows a good bond to easily be achieved between the electrode material and the separator.

N-methyl 1-2 pyrimidinone or acetone may be used, by way of example, as the solvent for production of the electrodes and the coating materials for the polyolefin separator. The proportion of HFP in the PVDF-HFP copolymer may differ in the negative electrode and in the positive electrode. Typical agents are Solef 20615 with about 6 percent by weight of HFP and Kynar Powerflex with about 5–6 percent by weight of HFP.

The electrochemically active material of the positive electrode sheet may be a material from the group of ternary (Li-Me1-O) or quarternary (Li-Me1-Me2-O) lithium transitional metal oxides, with Me 1 and Me 2 being chosen from Ti, V, Cr, Fe, Mn, Ni and Co, and with the compound additionally containing, if required, up to about 15 percent by atomic weight of Mg, Al, N or F to stabilize the structure.

The electrochemically active material of this positive electrode may have a BET surface area of about 0.1–about 2 $m^2/g$ and a particle size of about 1 to about 50 µm. In particular, $LiCoO_2$, with an Li/Co ratio of about 0.98 to about 1.05, is used as the material for the positive electrode. The paste mixture for producing positive electrode sheets should contain between about 65 and about 98 percent by weight, and preferably about 75 to about 95 percent by weight, based on the weight of the paste, of a lithium transitional metal oxide.

In particular, the negative electrode sheet contains graphitized carbon modifications as the electrochemically active material. The paste mixture for producing negative electrode sheets contains about 55 to about 95 percent by weight, preferably about 65 to about 85 percent by weight, based on the weight of the paste, of carbon material.

In general, the paste mixtures for producing such electrode sheets contain about 50 to about 75 percent by weight, and preferably about 55 to about 65 percent by weight, based on the weight of the paste, of solvent. The viscosity of the original paste, prior to drying, is set to about 1 to about 10 Pascals, preferably about 3 to about 6 Pascals.

EXAMPLE 9.9 g of a binder polymer (Kynar Powerflex®), 94 g LiCoO$_2$, 3.3 g of conductive soot (Super P), 3.3 g of graphite (KS 6) and 16.5 g of dibuthylphthalate are added to acetone to produce a cathode, and the coating substance that is obtained is wiped onto a carrier sheet by means of a semiautomatic film drawing appliance (Simex). The resultant, freestanding, positive substance film is then laminated onto metal mesh (2A16-077F, Delker) so that the metal mesh is in the center.

In order to produce an anode, 12.4 g of binder polymer (SOLEF 20615®), 96.2 g of spherical graphite (MCMB), 2.75 g of conductive soot (Super P), and 26.1 g of dibuthylphthalate were added to acetone, and the resultant coating substance was wiped onto a carrier sheet by means of a semiautomatic film drawing appliance (Simex). The resultant, freestanding, negative substance film was then laminated onto metal mesh (2Cu6-077F+A, Delker) so that the metal mesh was in the center.

A commercially available polyolefin separator was coated with a solution of (PVDF-HFP) and, optionally, with a softener such as dibuthylphthalate in acetone using an airbrush pistol, so that the dry thickness was approximately 1–2 µm once the acetone evaporated.

Two laminated cathode assemblies, separator coated on both sides, and a laminated anode assembly were laminated to form a symmetrical cell. Six obtained cells were stacked to form a stack and welded to the output conductor. After replacement of the softener by an organic lithium electrolyte (LP 50, Merck) and subsequent packaging in an aluminum composite sheet (Lawson Mardon, USA) coated on both sides, these stacks were formed, degassed and cycled at room temperature at 1C.

The drawing shows the capacitance of the resulting 6-bicell stack as a function of the number of cycles n for discharging ($C_E$) with a current of magnitude 1C (750 mA) in the range 3.0 to 4.2 volts (at room temperature)(curve 1). In comparison, curve 2 shows the capacitance of the 6-bicell stack in which a carrier polymer with 11-12 percent by weight of HFP was used.

The particular advantages of using proportions of HFP which are less than about 8 percent by weight and of using a polyolefin separator which is coated with an identical polymer mixture are that this results in a cell assembly with optimum adhesion over the boundary surfaces. Cells such as these have a considerably increased load capability and improve cycle stability.

What is claimed is:

1. An electrochemical element comprising at least one positive electrode assembly and at least one negative electrode assembly produced by forming a paste from:

a PVDF-HFP-copolymer with a proportion of HFP to PVDF of less than about 8% by weight, an electrochemically active material insoluble in the polymer, and a solvent, in which paste the active material is finely dispersed in the polymer, forming an electrode film by applying the paste to a carrier sheet, applying a PVDF-HFP-copolymer with a proportion of HFP to PVDF of less than about 8% by weight, and with the proportion of PVDF-HFP in the negative electrode being different than the proportion of PVDF-HFP in the positive electrode, to a polyolefin separator and laminating the electrode film to the polyolefin separator.

2. The element as claimed in claim 1, wherein the solvent is N-methyl 1-2 pyrimidinone or acetone.

3. The element as claimed in claim 1, wherein the electrochemically active material is selected from the group consisting of ternary (Li-Me1-O) and quaternary (Li-Me1-Me2-O) lithium transitional metal oxides, and wherein Me 1 and Me 2 are selected from the group consisting of TI, V, Cr, Fe, Mn, Ni and Co.

4. The element as claimed in claim 3, wherein the electrochemically active material contains up to about 15 percent by atomic weight of Mg, Al, N or F as a stabilizer.

5. The element as claimed in claim 1, wherein the electrochemically active material is graphitized carbon.

6. The element as claimed in claim 1, wherein the active material has a BET surface area of about 0.1 –about 2 m$^2$/g and a particle size of about 1 to about 50 µm.

7. The element as claimed in claim 1, wherein the electrochemically active material is LiCoO$_2$, with an Li/Co ratio of about 0.98 to about 1.05.

8. The element as claimed in claim 1, wherein the paste contains about 55 to about 95 percent by weight, based on the weight of the paste, of carbon material.

9. The element as claimed in claim 1, wherein the paste contains between about 65 and about 98 percent by weight, based on the weight of the paste, of a lithium transitional metal oxide.

10. The element as claimed in claim 1, wherein the paste contains about 50 to about 75 percent by weight, based on the weight of the paste, of the solvent.

11. The element as claimed in claim 1, wherein the viscosity of the paste, prior to drying, is about 1 to about 10 Poises.

* * * * *